(12) United States Patent
Bertolami

(10) Patent No.: US 9,128,110 B2
(45) Date of Patent: Sep. 8, 2015

(54) DEVICE AND METHOD FOR MEASURING THE SPEED OF A HAULAGE CABLE OF A CABLEWAY, IN PARTICULAR A CHAIRLIFT OR A CABLE CAR

(71) Applicant: POMAGALSKI, Voreppe (FR)

(72) Inventor: Olivier Bertolami, Grenoble (FR)

(73) Assignee: POMAGALSKI, Voreppe (FR)

( * ) Notice: Subject to any disclaimer, the term of this patent is extended or adjusted under 35 U.S.C. 154(b) by 201 days.

(21) Appl. No.: 13/773,949

(22) Filed: Feb. 22, 2013

(65) Prior Publication Data

US 2013/0213133 A1 Aug. 22, 2013

(30) Foreign Application Priority Data

Feb. 22, 2012 (FR) ...................................... 12 00517

(51) Int. Cl.
*G01P 3/02* (2006.01)
*G01P 3/64* (2006.01)
*G01P 3/66* (2006.01)
*B61B 12/00* (2006.01)

(52) U.S. Cl.
CPC . *G01P 3/02* (2013.01); *B61B 12/00* (2013.01); *G01P 3/64* (2013.01); *G01P 3/66* (2013.01)

(58) Field of Classification Search
USPC ........................ 73/490, 489, 495, 158, 861.06
See application file for complete search history.

(56) References Cited

U.S. PATENT DOCUMENTS

| 4,210,019 | A | * | 7/1980 | Laurent ........................... 73/158 |
| 4,248,085 | A | * | 2/1981 | Coulthard .................. 73/861.06 |
| 5,029,481 | A | * | 7/1991 | Keech ......................... 73/861.06 |
| 5,263,309 | A | * | 11/1993 | Campbell et al. ............... 57/264 |
| 5,561,245 | A | * | 10/1996 | Georgi et al. ............. 73/152.02 |
| 5,834,942 | A | * | 11/1998 | De Angelis ................... 324/522 |
| 7,889,327 | B2 | | 2/2011 | Sikora |

FOREIGN PATENT DOCUMENTS

| CH | 588 703 AS | 6/1977 |
| EP | 0 355 994 A1 | 2/1990 |
| FR | 1549170 | 11/1968 |

* cited by examiner

*Primary Examiner* — Helen Kwok
(74) *Attorney, Agent, or Firm* — Oliff PLC

(57) ABSTRACT

Device for measuring a haulage cable of a cableway, in particular a chairlift or a cable car, the haulage cable including marks, and the device including first and second sensors configured to transmit respectively first and second information signals relative to the presence of the marks, the second sensor being located at a reference distance from the first sensor, a first determination device configured to determine a phase shift between the first and second information signals and a second determination device for determining a speed information of the haulage cable from the determined phase shift and the reference distance.

3 Claims, 2 Drawing Sheets

DEVICE AND METHOD FOR MEASURING THE SPEED OF A HAULAGE CABLE OF A CABLEWAY, IN PARTICULAR A CHAIRLIFT OR A CABLE CAR

TECHNICAL FIELD OF THE INVENTION

The invention relates to the measuring of the speed of a haulage cable of a cableway, in particular a chairlift or a cable car.

STATE OF THE ART

Currently, the overhead cables of cableways, such as lifts of the chairlift or cable car type, are driven by a driving pulley actuated by a driving motor. In order to measure the cable speed, one measures the speed of the driving pulley, or of a roller for guiding the cable, by means of a speed sensor, such as an encoder or a tachometer. But this measure is not precise enough because the cable can slip on the pulley. In addition, these sensors are prone to wear and thermal dilation. The inaccuracy of the cable speed can lead to variations in cable speed, in the number of hauled vehicles and to stops.

One can quote French patent FR 1 549 170 which describes a device for detecting marks on a steel cable, the marks on the cable being formed by magnetized areas. But the device does not enable to calculate the speed of a cable, this speed being known and estimated as constant.

One can moreover quote European patent application EP 0 355 994 which reveals an apparatus for measuring the speed of a cable comprising induced electrostatic charges on the cable surface. The apparatus comprises first and second electrostatic charge sensors, each of them being adapted to generating an electric signal whose amplitude represents the quantity of electrostatic charges on the surface. But it is not adapted to measuring the speed of a cable coated with a non-metallic coating.

OBJECT OF THE INVENTION

The object of the invention is to solve these disadvantages, and more particularly to provide a device for measuring the speed of a haulage cable of a cableway which is sufficiently precise and simple to use, in particular in order to transport people with an improved safety and reliability.

According to an aspect of the invention, it is proposed a device for measuring the speed of a haulage cable of a cableway, in particular a chair-lift or a cable car, the haulage cable including marks, and the device including first and second sensors configured to transmit respectively first and second information signals relative to the presence of the marks, the second sensor being located at a reference distance from the first sensor, a first determination means configured to determine a phase shift between the first and second information signals and a second determination means for determining a speed information of the haulage cable from the determined phase shift and the reference distance, characterized in that the first and second sensors are capacitive distance sensors, each of them being configured to transmit an information signal relative to the distance between the marks on the haulage cable and said sensor.

Thus, one measures the speed as close as possible to the cable for a better precision. Such a measuring device is simple to use and requires few adjustments and a reduced number of calibration steps.

The capacitive sensors have the advantage of being able to detect the presence of any types of objects because they are sensitive to metals and non-metals. Such sensors are particularly adapted to metal cables having a non-metallic coating.

The reference distance can be strictly lower than the smallest distance separating two marks on the cable.

Thus, the speed measurement is not disturbed by a possible elongation of the cable, resulting from the traction forces applied to the cable and from temperature effects, which could result in a lengthening of the distance between two marks on the cable.

The cable can comprise several wires assembled so as to form several strands, the strands being helically twined so as to form grooves corresponding to the marks on the cable and arranged between two successive cable strands.

The helical structure of the cable naturally forms marks (grooves) on the cable and enables to avoid to put additional marks on the cable.

According to another aspect of the invention, it is proposed a method for measuring the speed of a haulage cable of a cableway, in particular a chairlift or a cable car, the haulage cable including marks, and the method including first and second signalings for the presence of the marks, the second signaling being performed at a reference distance from the first signaling, a determination of a phase shift between the first and second signalings and a determination of a speed information of the haulage cable from the determined phase shift and the reference distance, characterized in that the first and second signalings include respectively first and second capacitive distance sensors, each of them being configured to transmit an information signal relative to the distance between the marks of the haulage cable and said sensor.

BRIEF DESCRIPTION OF THE DRAWINGS

Other advantages and features will more clearly arise from the following description of particular embodiments of the invention given as nonrestrictive examples and represented in the annexed drawings, in which.

DETAILED DESCRIPTION

Figure 1:
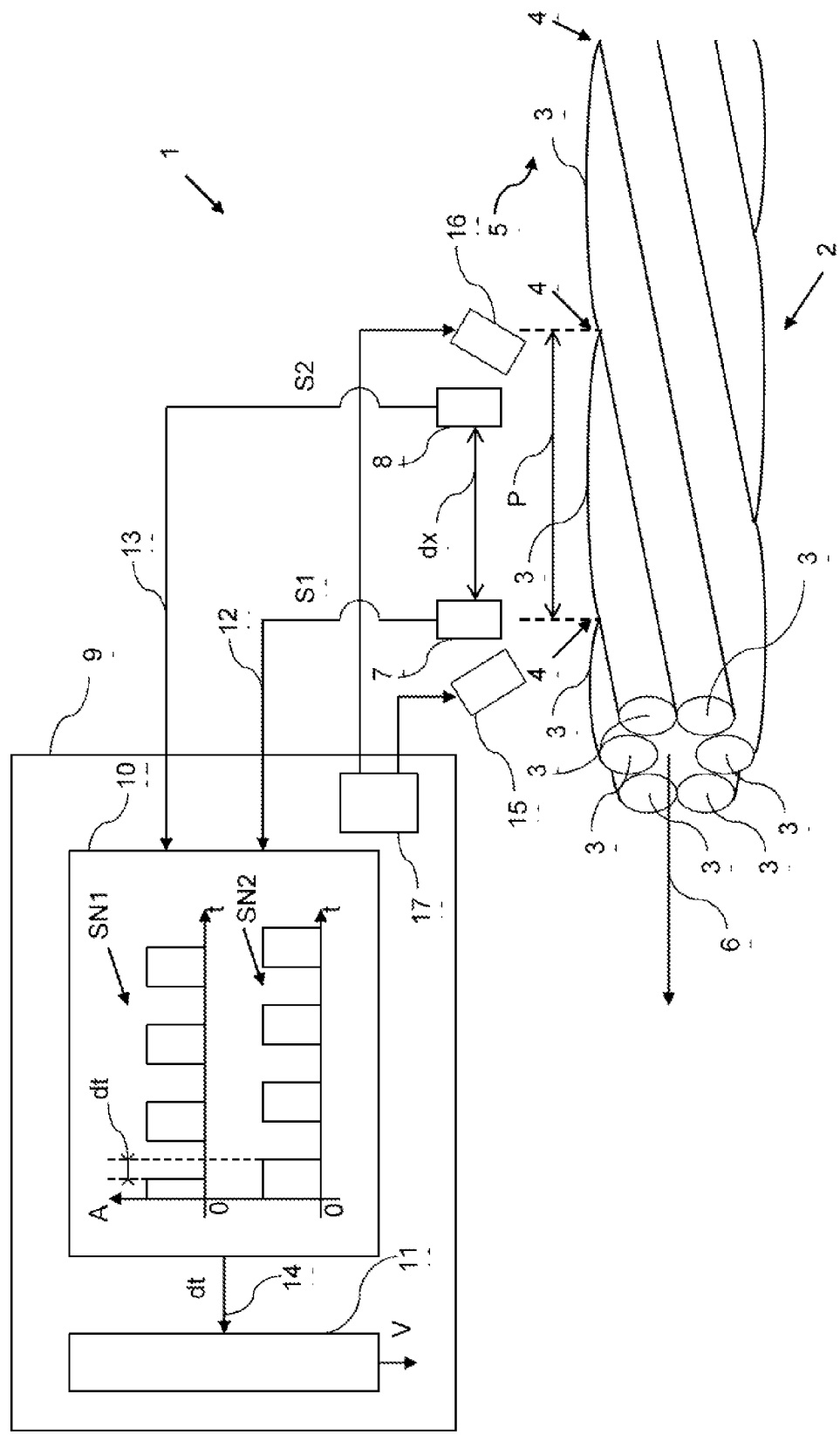
FIG. 1 schematically illustrates a device for measuring the speed of a haulage cable of a cableway according to the invention.

In FIG. 1, it is represented a device 1 for measuring a speed information V of a haulage cable 2 of a cableway.

In a conventional way, in a lift installation, the cable 2 to which are attached vehicles (cars, seats, funicular) transporting passengers is driven by a driving pulley placed in a station and actuated by a driving motor of an electric type, not represented here for simplification purposes. In particular, the cable 2 is made out of metal and have a strong tensile strength. The cable 2 can be possibly covered, partially or entirely, with a protection coating out of a non-metallic material, for example plastic.

The cable 2 generally comprises several helically twined wires. A set of helically twined wires forms a strand 3, and the cable 2 can moreover comprise several strands 3 which are also helically twined for a better tensile strength. In FIG. 1, it is represented a cable 2 including, for example, six helically twined strands 3. The helically twined strands 3 form grooves 4, so that each groove 4 is located between two successive strands 3 of the cable 2. One can note that in a helical configuration, the strands 3 and the grooves 4 are located alternatively along the cable 2 and form marks 5 on the surface of the cable 2. Moreover, the cable 2 has a pitch P corresponding to the distance between two successive marks 5 on the cable, for example the distance between two successive grooves 4 or between two successive strands 3. It is also represented a longitudinal axis 6 along which the cable 2 moves forwards or backwards.

In addition, the measuring device 1 comprises first and second sensors 7, 8, and a measuring block 9. The measuring block 9 includes a first determination means 10 for determining a phase shift dt between two signals and a second determination means 11 for determining the speed information V of the cable 2. The measuring block 9 can be, for example, a microprocessor integrated in a computer or a programmable automat.

In a general way, the sensors 7, 8 are presence sensors for the marks 5 on the cable 2. The first sensor 7 transmits a first information signal S1 relative to the presence of a mark 5 on the cable 2 towards the first determination means 10, through a connection 12. The second sensor 8 transmits a second information signal S2 relative to the presence of a mark 5 on the cable 2 towards the first determination means 10, through a connection 13. When the cable 2 moves, the marks 5 moves past the sensors 7, 8, thus each signal S1, S2 emitted by a sensor 7, 8 has an amplitude which varies according to whether the mark is detected or not by the sensor. For example, the amplitude of the signal is maximum when the mark is detected, and minimum when it is not. Moreover, the second sensor 8 is located at a reference distance dx from the first sensor 7. The first determination means 10 receives the two signals S1 and S2 and calculates their phase shift dt, which it transmits to the second determination means 11 through a connection 14. The second determination means 11 then determines a speed V of the cable 2, preferentially a speed V of a longitudinal displacement of the cable 2, from the phase shift dt and the reference distance dx. Furthermore, the reference distance dx is strictly lower than the smallest distance separating two marks 5 on the cable 2. Thus, for measuring the speed V of the cable 2, it is not necessary that the cable marks are regularly spaced on the cable 2. According to the embodiment illustrated in FIG. 1, the smallest distance separating two marks 5 on the cable 2 is equal to the pitch P of the cable 2. Moreover, the reference distance dx remains lower than the pitch P, even in the event of an elongation of the cable 2.

The phase shift dt corresponds to the time during which a mark 5 of the cable 2, for example a groove 4, or a strand 3 covers the reference distance dx. The second determination means 11 determines the longitudinal speed V of the cable 2 according to the following equation:

$$V = dx/dt$$

with

V: the speed of the cable 2;

dx: the reference distance between the first and second sensors 7, 8; and dt: the phase shift between the first and second signals S1, S2.

Moreover, the second processing means 11 is configured to determine the direction of displacement of the cable, forwards of backwards, according to the sign of the phase shift dt.

In order to detect the passage of a mark 5 on the cable, one can use various types of sensors. For example the sensors can be digital or analog ones. The digital sensors transmit digital signals S1, S2 towards the first determination means 10. In this case, the first determination means includes synchronization means for synchronizing the signals S1, S2 so that they have the same frequency before calculating their phase shift dt. Thus, one improves the calculation accuracy for the phase shift between the signals S1, S2.

The sensors 7, 8 can also be analog sensors which transmit analog signals S1, S2 towards the first determination means 10. In this case, the first determination means 10 includes analog/digital converters for converting the first and second analog signals into two digital signals, respectively SN1 and SN2, and calculates the phase shift dt between the two digital signals SN1, SN2. The analog/digital converters are preferably coupled with a clock signal generator so as to synchronize the digital signals SN1, SN2. In particular, the synchronization of the digital signals SN1, SN2 allows to generate two signals SN1, SN2 having the same frequency. In FIG. 1, it is represented the amplitudes A of these digital signals SN1, SN2 according to time T. One can note that each digital signal SN1, SN2 has a high level when there is a mark facing the associated sensor, and a low level otherwise.

According to a preferred embodiment, the sensors 7, 8 are inductive analog distance sensors. For example, the cable 2 is metallic and the sensors 7, 8 are inductive analog distance sensors of the eddy current type. In this case, the sensors 7, 8 produce an oscillating electromagnetic field, and the field is attenuated when penetrated by the metal surface of the cable 2. The presence information signal delivered by the sensors 7, 8 can be an electric voltage whose value varies according to the relative position of the mark 5 with respect to the sensor, i.e. according to the distance of the surface of the mark 5 from the sensor 7, 8. In addition, such sensors 7, 8 are contactless because the interaction between the cable and the sensor is performed via the oscillating electromagnetic field. The analog sensor delivers a signal which has a high level when the cable is close to the sensor, and a low level otherwise. Advantageously, such sensors 7, 8 are able to detect the presence of any metal object and are particularly adapted to haulage cables 2 of a cableway which have helically twined strands 3. In a variant, additional metal marks can be placed on the surface of the cable 2, which are different from the grooves 4 or strands 3.

According to another embodiment, the cable 2 is ferromagnetic and the sensors 7, 8 are inductive analog distance sensors having a variable reluctance. The unit formed by the sensor 7, 8 and the cable 2 forms a magnetic circuit, and the distance between the surface of the cable 2 and the sensor 7, 8 determines the reluctance of the magnetic circuit. In this case, the signals delivered also have levels which vary according to the distance between the surface of the ferromagnetic marks 5 of the cable 2 and the sensor 7, 8.

According to another embodiment, the sensors 7, 8 are capacitive analog distance sensors. The measuring head of such sensors is formed of a cylindrical conductor and a metal envelope forming a condenser having a reference capacity. When the marks 5 of the cable 2 approach the end of the head of the sensors 7, 8, the reference capacity varies and the signal delivered by the sensor decreases. Such sensors are particularly adapted to the measuring of the speed of a cable coated with a non-metallic coating, for example a plastic coating. In this embodiment, the marks can be pins located at the surface of the coating. It is not either necessary to space the marks regularly on the surface of the cable 2.

According to still another embodiment, the sensors 7, 8 can be image acquiring systems, for example miniaturized digital cameras, configured to capture images of the surface of the cable 2. In this embodiment, the measuring device 1 comprises at least one lighting system 15, 16 associated with the two sensors 7, 8, or one lighting system per sensor. The lighting systems 15, 16 are controlled by control means 17, preferably included in the measuring block 9. Each lighting system 15, 16 can include one or more electroluminescent diodes for lighting a surface of the cable 2 in order to allow the sensors 7, 8 to acquire images of the surface and to transmit them, through first and second digital or analog signals S1, S2, to the first determination means 10. The first determination means 10 moreover comprises processing means for digital images, for example a digital signal processor provided with software tools for the recognition of objects within an image. The image processing means recognize the presence or not of the marks 5 in the image and generate two digital signals, respectively SN1, SN2, having a high level, when the mark is recognized in the image, and a low level otherwise. In this embodiment, the marks can be a mark placed on the surface of the cable 2, for example a mark made by means of a reflective painting.

One can advantageously use two sensors 7, 8 of the same type, for a better measuring accuracy. One can also use a combination of sensors of different types.

Figure 2:
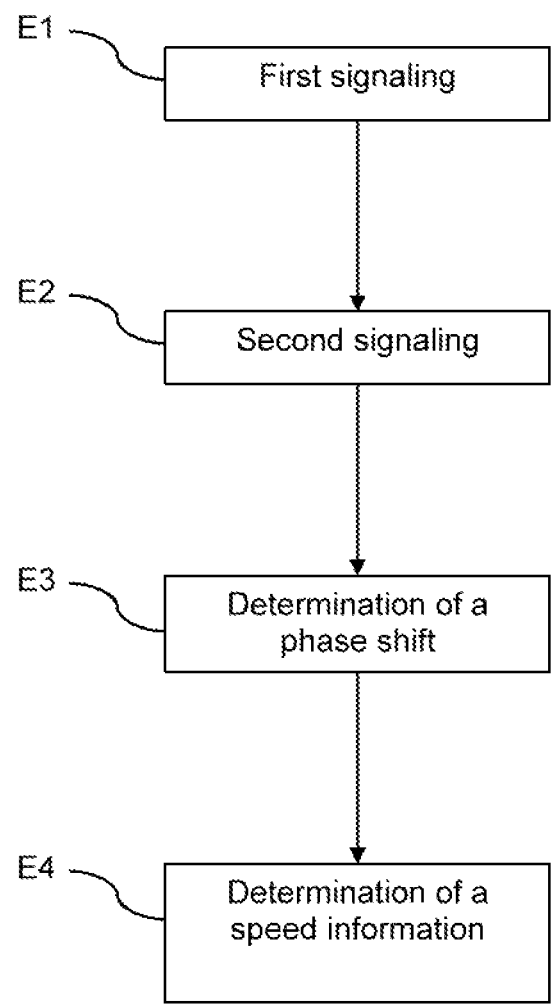
FIG. 2 schematically illustrates the main steps of a method for measuring the speed of a haulage cable of a cableway according to the invention.

In FIG. 2, it is represented the main steps of a method for measuring the speed of a haulage cable of a cableway. This method can be implemented by the measuring device 1 defined above. The cable has marks, for example grooves separating two successive strands of the cable, or others. The method includes a first step E1 in which a first signaling is performed for signaling the presence of the marks on the cable at a first point of passage of the cable, then a second step E2 in which a second signaling is performed for signaling the presence of the marks on the cable at a second point of passage of the cable distant by a reference distance dx from the first point of passage. Then one determines in a third step E3 a phase shift between the two preceding signalings, and one determines in a fourth step E4 a piece of information relative to the speed V of the cable from the determined phase shift and the reference distance.

The invention claimed is:

1. A device for measuring a speed of a haulage cable of a cableway, the haulage cable comprising a plurality of wires assembled so as to form a plurality of strands, the strands being helically twined so as to form grooves on the haulage cable and arranged between two successive strands of the haulage cable, and the device including:

first and second capacitive distance sensors configured to transmit respectively first and second information signals relative to the distance between the grooves on the haulage cable and the first and second sensors, the second sensor being located at a reference distance from the first sensor, a first determination device configured to determine a phase shift between the first and second information signals and a second determination device for determining a speed information of the haulage cable from the determined phase shift and the reference distance.

2. The device according to claim 1, wherein the reference distance is strictly lower than a smallest distance separating two grooves on the haulage cable.

3. A method for measuring a speed of a haulage cable of a cableway, the haulage cable comprising a plurality of wires assembled so as to form several strands, the strands being helically twined so as to form grooves on the haulage cable and arranged between two successive strands of the haulage cable, the method including:

first and second signalings including respectively first and second capacitive distance sensors configured to transmit an information signal relative to the distance between the grooves on the haulage cable and the first and second sensors, the second signaling being performed at a reference distance from the first signaling, a determination of a phase shift between the first and second signalings and a determination of a speed information of the haulage cable from the determined phase shift and the reference distance.

* * * * *